United States Patent [19]
Endoh

[11] Patent Number: 5,223,204
[45] Date of Patent: Jun. 29, 1993

[54] METHOD AND APPARATUS FOR REVERSING A TUBULAR BAG

[75] Inventor: Shigeru Endoh, Kasukabe, Japan

[73] Assignee: Get, Inc., Ibaraki, Japan

[21] Appl. No.: 951,296

[22] Filed: Sep. 21, 1992

Related U.S. Application Data

[63] Continuation of Ser. No. 665,125, Mar. 6, 1991, abandoned.

[30] Foreign Application Priority Data

Mar. 6, 1990 [JP] Japan ................................. 2-54587

[51] Int. Cl.⁵ .............................................. B29C 63/36
[52] U.S. Cl. .................................... 264/516; 138/97; 156/287; 156/294; 156/382; 264/36; 264/269; 264/570; 264/572; 425/387.1
[58] Field of Search ................. 264/36, 516, 269, 570, 264/572, 573; 156/287, 294, 382; 138/97, 98; 425/387.1

[56] References Cited

U.S. PATENT DOCUMENTS

| | | | |
|---|---|---|---|
| 3,927,164 | 12/1975 | Shimabukuro | 156/294 |
| 4,064,211 | 12/1977 | Wood | 264/516 |
| 4,385,885 | 5/1983 | Wood | 156/294 |
| 4,770,562 | 9/1988 | Muller et al. | 156/287 |
| 4,883,557 | 11/1989 | Morihaga et al. | 156/287 |

FOREIGN PATENT DOCUMENTS

| | | | |
|---|---|---|---|
| 59-87117 | 5/1984 | Japan | 156/287 |
| 60-242038 | 12/1985 | Japan . | |
| 61-283531 | 12/1986 | Japan | 156/287 |
| 1211080 | 2/1986 | U.S.S.R. | 156/287 |
| 2082285 | 3/1982 | United Kingdom . | |

Primary Examiner—Jeffery Thurlow
Assistant Examiner—Mathieu Vargot
Attorney, Agent, or Firm—Lowe, Price, LeBlanc & Becker

[57] ABSTRACT

An apparatus for reversing a tubular bag for internally lining a utility pipe installed underground, which includes a container for defining a closed space and containing a liquid body, constructed such that an amount of a liquid body therein has first and second level surfaces, the first partially defining the closed space and the second being exposed to atmospheric air; a compressor to supply compressed air to the closed space; and the tubular bag to be reversed. The tubular bag is primarily arranged in a manner such that it penetrates through the liquid body passing the first and second level surfaces and also penetrates through the closed space, with one end portion of the bag placed in atmospheric air and the other end portion thereof reversed and fixed, and some of the reversed portion partially defining the closed space so that when the pressure in the closed space is increased that portion of the tubular bag which is defining the closed space is forced to inflate and be reversed further. Compressed air is supplied to the closed space by a compressor, whereupon the tubular bag is inflated and be reversed further. The bag itself can be used to contain the liquid body without employing a container.

3 Claims, 4 Drawing Sheets

5,223,204

METHOD AND APPARATUS FOR REVERSING A TUBULAR BAG

This application is a continuation of application Ser. No. 07/665,125 filed Mar. 6, 1991, now abandoned.

Field of the Invention

The present invention relates to a method for reversing a tubular bag and an apparatus for the method, or more particularly, the invention relates to an improved method for inserting an airtight tubular bag in a pipe by pneumatically turning the bag inside out so as to internally line the pipe, and an apparatus useful in the lining method.

Description of the Prior Art

When an underground utility pipe or an underground industrial pipe, such as sewer pipe, gas pipe, and electric conduit pipe, is defective or needs higher durability, the pipe is repaired, reinforced and refreshed without being dug out or disassembled into sections. This method of repairing a pipe is known and practiced in the field of civil engineering. Typically, the method is disclosed by Japanese Provisional Patent Publication (Kokai) No. 60-242038.

According to the publication, this method of pipe repair comprises inserting a sufficiently long tubular flexible liner into the defective pipe by fluid pressure. The tubular liner is made of a flexible resin-absorbable material impregnated with a hardenable resin, and has the outer surface coated with an airtight film. More particularly, according to the publication, the tubular flexible liner is closed at one end and open at the other. The tubular flexible liner is first flattened. The closed end of the tubular liner is tied to a control rope. The open end of the tubular liner is made to gape wide and hooked at the end of the defective pipe in a manner such that the wide-opened end of the liner completely and fixedly covers and closes the pipe end, or it is hooked on a shooter port 4, as shown in FIG. 6. Then, a fluid with pressure such as water and air is applied to the tubular liner in a manner such that the fluid urges the tubular liner to enter the defective pipe. Since the open end of the tubular liner is hooked at the end of the pipe or at the shooter port, it remains there while the rest of the flexible liner is turned inside out as it proceeds in the pipe. (Hereinafter, this manner of insertion shall be called "reversing".) When the entire length of the tubular liner is reversed (or turned inside out) in the pipe, the control rope holds the closed end of the tubular liner to thereby control the length of the tubular liner in the pipe. Then the reversed tubular liner is pressed against the inner surface of the defective pipe with the pressurized fluid, and the tubular flexible liner is hardened by heating, or by some other procedure depending on the hardening property of the material of the liner. Or it is also practiced that an airtight tubular bag is similarly inserted in the already inserted tubular liner and inflated to thereby press the liner against the inner surface of the pipe. In this manner it is possible to line the inside wall of the defective pipe with a rigid liner without digging the ground and disassembling the pipe into sections.

Now, in the underground pipe repair operation as described above, if compressed air is used as the pressurized fluid to cause reversing of the liner tube, it was necessary to contain all the liner tube inside a closed container 25, as shown in FIG. 6. As the compressed air is supplied into the container 25, the tubular bag 10 is urged to shoot out through the shooter port 4 while being reversed. When the amount of this tubular bag or a liner tube is large, the size of the container 25 must be large and necessitates a huge installation space.

Therefore, the present invention was contrived in view of the above problem, and it is an object of the invention to provide an improved method for reversing a tubular bag and an apparatus for the method which enable an efficient operation without using a large container for the tubular bag.

SUMMARY OF THE INVENTION

In order to attain the above-described object, the inventor contrived an improved method for reversing a tubular bag and an apparatus for the method. The inventive apparatus provides a closed space (S) defined partially by a level surface of a liquid body which has one other level surface exposed to atmospheric air. A compressed air supply source (6) is connected to the closed space. The closed space is also defined at least partially by a certain portion of a tubular bag (10), which is passed through the closed space, through the first level surface of the liquid body, through the liquid body, through the second level surface of the liquid body, and into the atmospheric air.

A preferred embodiment of the apparatus for reversing the tubular bag comprises:

a means for defining a closed space and containing a liquid body, constructed in a manner such that an appropriate amount of the liquid body when contained therein has first and second level surfaces, the first level surface partially defining the closed space and the second level surface being exposed to atmospheric air;

a compressed air supply source for supplying compressed air to the closed space;

an appropriate amount of the liquid body contained in the means; and the tubular bag to be reversed which is primarily arranged in a manner such that it penetrates through the liquid body passing the first and second level surfaces and also penetrates through the closed space, with one end portion of the bag placed in atmospheric air and the other end portion thereof reversed and fixed, and some of the reversed portion partially defining the closed space so that when the pressure in the closed space is increased that portion of the tubular bag which is defining the closed space is forced to inflate and be reversed further.

In an embodiment of the apparatus of the invention, the means for defining a closed space and containing a liquid body is a tank which is divided into two rooms by a partition wall, the two rooms communicating with each other at the bottom of said tank.

In another embodiment of the apparatus of the invention, the means for defining a closed space and containing a liquid body is a tubular pipe of which the liquid containing portion has a cross section shaped like a letter "U".

In still another embodiment of the apparatus of the invention the means for defining a closed space and containing a liquid body is formed by a reversed portion of the tubular bag which is supported in a manner such that the liquid containing portion of the tubular bag has a cross section shaped like a letter "U".

According to the invention, an improved method for reversing the tubular bag is characterized in the steps of:
(i) preparing a means for defining a closed space and containing a liquid body constructed in a manner such that an appropriate amount of the liquid body when contained therein has first and second level surfaces, the first partially defining the closed space and the second being exposed to atmospheric air; (ii) arranging the tubular bag to be reversed in a manner such that it penetrates through the liquid body passing the first and second level surfaces and also penetrates through the closed space, with one end portion of the bag placed in atmospheric air and the other end portion thereof reversed and fixed, and some of the reversed portion partially defining the closed space; and (iii) increasing the pressure in the closed space by supplying compressed air to it from a compressed air supply source, to thereby urge that portion of the tubular bag which is defining the closed space to inflate and be reversed further.

Therefore, according to the invention, when the pressure in the closed space is increased with the compressed air supplied from the compressed air supply source, the first level surface of the liquid body is pressed down until the fluid head on the side of the second level surface balances the increased pressure in the closed space, and the reversible tubular bag is pressed and pushed outwardly while being reversed whereby the closed space expands in that direction. As a result, the reversed portion of the tubular bag is forced to extend and enter a pipe to be lined. As the tubular bag advances in a pipe, the unreversed portion of the tubular bag is pulled in the same direction, and that portion of the tubular bag which has been in atmospheric air outside the second level surface of the liquid body is taken through the liquid body and the closed space, and eventually reversed in the pipe.

As it is clear from the above description, it is now not necessary to keep the entire body of the tubular bag in a closed container. Most part of the tubular bag can be placed outside the closed space. Thus, a small container will do, or if desired, it is possible to arrange the apparatus such that no container for the tubular bag is used, since the means for defining the closed space can entirely or partly comprise the tubular bag, as will be explained in detail later with reference to FIG. 4 or 5. Accordingly, by using the method and apparatus of the present invention, one can attain an efficient operation without using a large container for the tubular bag.

The above and other objects and features of the invention will appear more fully hereinafter in the following description given in connection with the accompanying drawings and the novelty thereof pointed out in the appended claims.

DETAILED DESCRIPTION OF THE INVENTION

Now, embodiments of the invention shall be explained with reference to the attached drawings.

Figure 1:
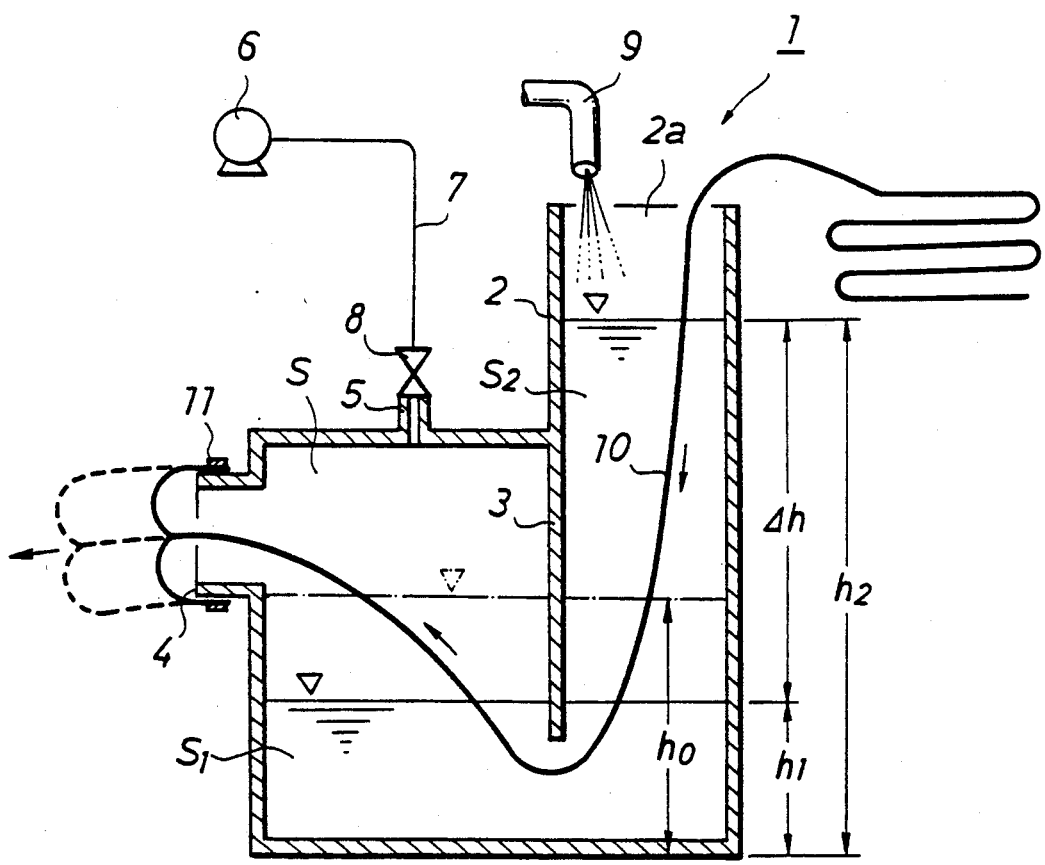
FIG. 1 is a vertical sectional view of an apparatus for reversing a tubular bag according to an embodiment of the invention.
Figure 2:
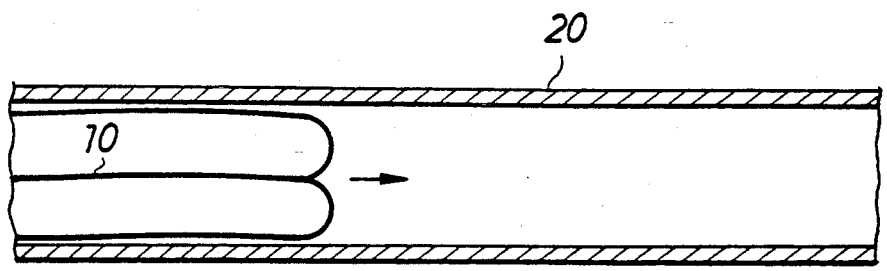
FIG. 2 is a sectional view of a tubular bag being reversed in a pipe.
Figure 3:
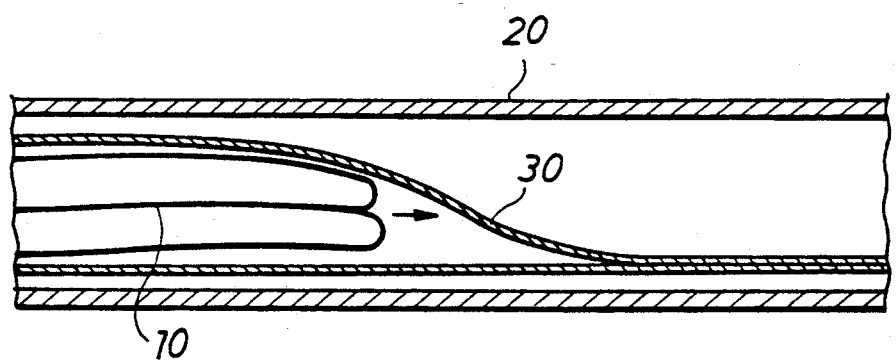
FIG. 3 is a sectional view of a tubular bag being reversed in a pipe to press a linear against the inner surface of the pipe.

FIG. 1 is a vertical sectional view of an embodiment of the apparatus for reversing a tubular bag according to the invention; FIGS. 2 and 3 are sectional views, respectively, of tubular bags being reversed in the pipes to be lined.

Referring to FIG. 1, the basic construction of an apparatus 1 for reversing a tubular bag 10 will be explained. Reference numeral 2 designates a container which is divided into two rooms, a room S1 and a room S2, by a partition wall 3, which does not reach the bottom of the container 2 such that there is left a passage between the room S1 and the room S2 along the bottom of the container 2. A shooter port 4 is provided at an upper part of a side wall partially defining the room S1 of the container 2. An air inlet port 5 is provided in the ceiling of the room S1 of the container 2. A compressor 6 is connected to the air inlet port 5 via a pipe 7 and a valve 8.

The room S2 of the container 2 opens into the atmosphere as its opening 2a at the top.

Water is supplied to the container 2 by means of a pipe 9. At the beginning of the operation, the water supplied in the container 2 has equal surface levels h0 in both the room S1 and the room S2, as shown in one-dot chain line in FIG. 1. By virtue of the existence of this water, there is formed a closed space S above the surface level h0 in the room S1.

In FIG. 1 reference numeral 10 designates a long flattened tubular bag whose one end has been passed into the container 2 by way of the opening 2a, the room S2, the water, the room S1, the closed space S, and is reversed just outside the shooter port 4 and fixed on the shooter port 4 with a band 11 such that the periphery of the shooter port 4 is wrapped round by the end of the bag 10. Thus, the closed space S is completely closed and sealed.

In this embodiment, the container 2 constitutes the means for defining the closed space and containing the liquid body.

Next, the method of the invention will be described by explaining how the apparatus 1 is operated to reverse the tubular bag 10.

The compressor 6 is driven whereupon the compressed air is supplied to the closed space S by way of the pipe 7, the valve 8, and through the air inlet port 5. As the pressure P in the closed space S is hightened, the level surface of the water in the room S1 is depressed by the increased internal pressure P and assumes a new level h1, while the level surface of the water in the room S2 is pushed up to a new level h2. Thus, a head difference of $\Delta h$, which is h2 minus h1, is generated. Supposing the specific gravity of the water in the container 2 is $\gamma$, the internal pressure P in the closed space S is equal to the sum of the atmospheric pressure and $\gamma \cdot \Delta h$.

When the internal pressure P of the closed space S is increased as described above, that portion of the tubular bag 10 which is closing the shooter port 4 is caused to inflate and be reversed as shown in the broken line in FIG. 1, and as a result the tubular bag advances in the direction indicated by the arrow and enters a pipe to be lined. In order to maintain the pressure P high enough to effect this pneumatic reversing of the tubular bag 10, the compressed air is continuously supplied to the expanding closed space S by the compressor 6.

As the tubular bag 10 is thus reversed the flat portion of the tubular bag 10 is pulled in the direction as indicated by the arrows in FIG. 1, and that portion of the tubular bag 10 which is laid outside the container 2 is pulled into the container 2 to pass through the water, the closed space S and then reversed inside the pipe.

In the above embodiment of the invention, since the water is used as the liquid body whose one level surface partially defines and seals the closed space S while the other level surface is exposed to atmospheric air, it is possible to place the tail part of the tubular bag outside the container 2 while the head part of it participates in sealing the closed space S so that the external tubular bag 10 can be led through the water without breaking the sealing of the closed space S during the reversing operation. Thus, it is now not necessary to put the entire body of the tubular bag 10 in a closed container; the most part of the tubular bag 10 can be placed outside the container 2 so that even if the volume of the tubular bag is huge, the container 2 can be small, and the installation space can be small too. Consequently, the operation efficiency is improved greatly.

Now, with reference to FIGS. 2 and 3, the pipe repair operation using the reversible tubular bag will be explained in detail.

In the example of FIG. 2, the tubular bag 10 itself constitutes the lining material impregnated with hardenable resin. The tubular bag 10 is pneumatically urged to turn inside out as it proceeds deeper into an underground pipe 20 which requires to be repaired or reinforced. The tubular bag 10 is pressed onto the inner wall of the pipe 20 by virtue of the high pressure inside the tubular bag 10.

In the example of FIG. 3, the tubular bag 10 does not consist of a lining material. A linear tube 30 constitutes the lining material which passed through the pipe 20 beforehand. The tubular bag 10 is reversed into this liner tube 30 and presses the tube 30 onto the inner wall of the pipe 20.

Next, referring to FIGS. 4 and 5, other embodiments of the reversing apparatus of the invention will be described. In these figures, the elements whose counterparts are found in FIG. 1 are designated by the same reference numerals as their counterparts; also the explanation of such elements are omitted here.

Figure 4:
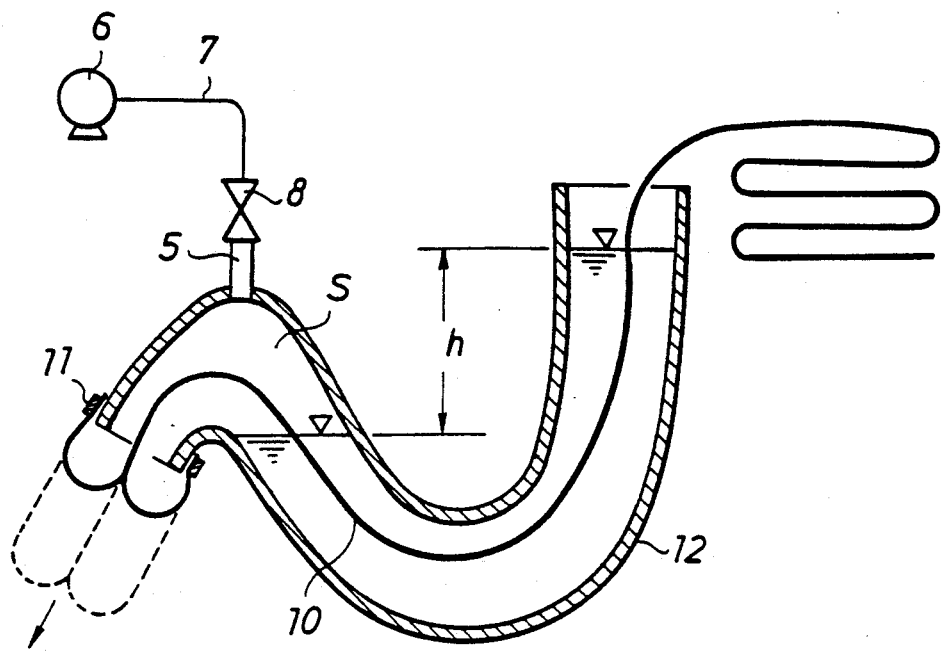
FIG. 4 is a vertical sectional view of an apparatus for reversing a tubular bag according to another embodiment of the invention.

In the embodiment shown in FIG. 4, a tubular container 12 having a lengthwise cross section shaped like a rounded letter "N" is used as the means for defining the closed space and containing the liquid body. The liquid containing part of the tubular container 12 has a profile shaped like a letter "U" such that the liquid body can have two level surfaces therein. An appropriate amount of water is put in the container 12. The closed space S is defined by the tubular container 12, one of the level surfaces of the water, and the reversed portion of the tubular bag 10.

As the compressed air is supplied to the closed space S by means of the compressor 6, the tubular bag 10 is inflated and reversed as shown by the broken line, like in the previous embodiment. On this occasion, the level surface of the water defining the closed space S is urged downward, and the other level surface of the water is pushed higher. In this embodiment, the tubular bag 10 can pass through the container 12 more smoothly than in the case of the first embodiment.

Figure 5:
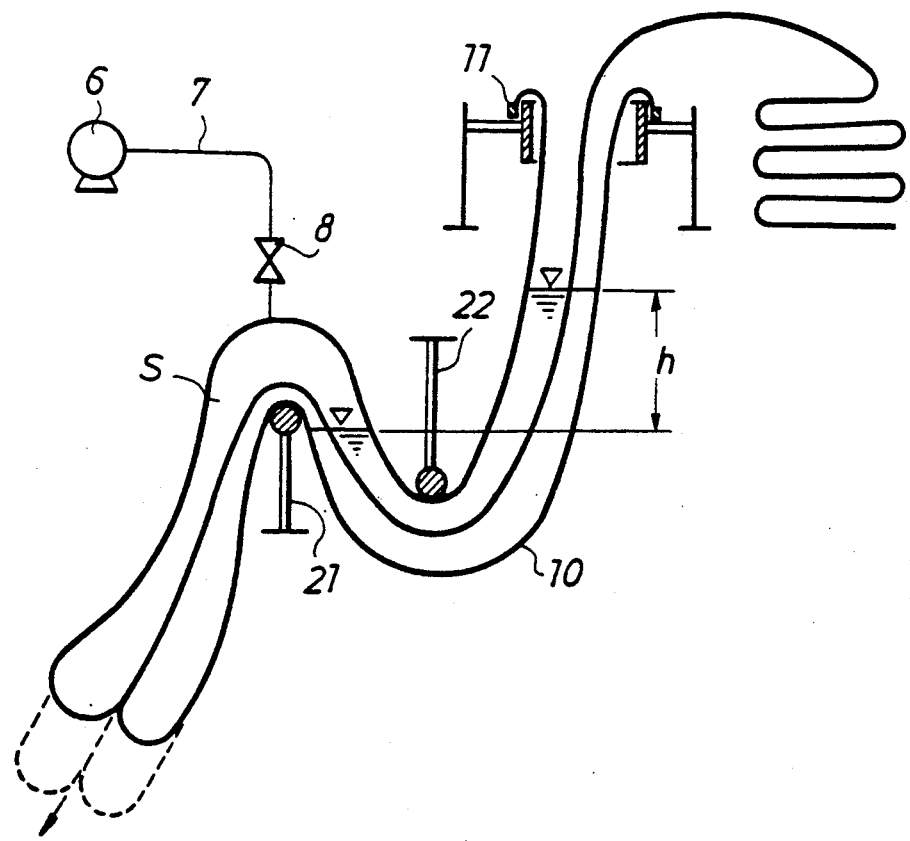
FIG. 5 is a vertical sectional view of an apparatus for reversing a tubular bag according to still another embodiment of the invention.
Figure 6:
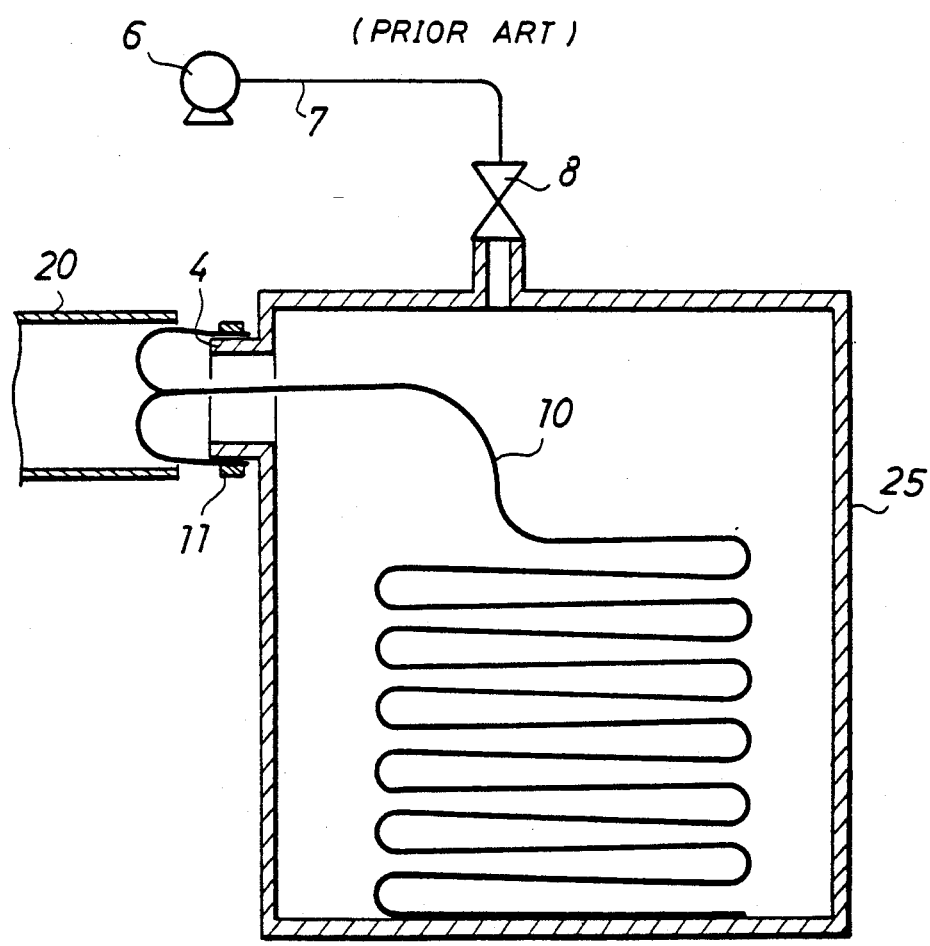
FIG. 6 is a vertical sectional view of a conventional apparatus for reversing a tubular bag.

FIG. 5 shows yet another embodiment of the reversing apparatus, in which a lengthy part of the tubular bag 10 is already recessed and formed like a letter "N" in profile, being supported by support means 21 and 22. The reversed portion of the tubular bag 10 constitutes the means for defining the closed space and containing the liquid body, as well as the tubular bag itself. Thus, there is provided no container unlike the two previous embodiments. A compressor 6 is connected to the closed space S by means of a pipe 7 and a valve 5.

As best seen in FIG. 5, the embodiment illustrated therein entirely dispenses with the need to contain the liquid in a rigid element such as, for example, container 2 in the embodiment per FIG. 1 or the tubular container 12 in the embodiment per FIG. 4. Instead, in the embodiment per FIG. 5 it is a reversed first length of the tubular bag 10 which serves as the sole containment means for containing the liquid. One end of the long tubular bag is reversed and is supported by a simple collar 11 so that end of tubular bag 10 is reversed and open to the atmosphere during use.

A length of bag 10 is initially reversed and extends downwardly of supporting collar 10, with a portion of the still unreversed length of the bag contained within it in order to be reversed further at an eversion point under the action of the pressurized air contained in space S. The portion of the reversed length which extends below collar 11 is then passed under a support 22, is then directed upward and passed over a second support 21, and is then disposed downwardly toward the eversion point (not numbered). The effect is to give the supported length of the reversed tubular bag a shape like the letter "N" as seen from a side.

By the disposition of the embodiment per FIG. 5 as described in the preceding paragraphs, it becomes possible to contain a quantity of liquid solely within the reversed length of the bag between collar 11 and the location at which the reversed length is supported by support 21. This quantity of liquid has a first liquid surface open to atmosphere. It also has a second liquid surface, adjacent the location of point of support at support 21, which helps define and seal the closed space S. When compressed air is provided through valve 8 into space S, the increased pressure within that space forces the sealing second liquid surface downward and, correspondingly, pushes the first liquid surface (exposed to atmosphere) higher, so that there is a liquid head "h" as illustrated in FIG. 5. The presence of the compressed air within enclosed space S, held at a pressure corresponding to the liquid head "h" helps to push the eversion point even further. More and more of the unreversed length of bag 10 is thus drawn: through the liquid, under the location of support by support 22, over the location of support by support 21, and to the eversion point, where more and more of it is everted and reversed. At all times, the liquid is contained solely within the initially reversed portion of the bag.

As the compressed air is supplied to the closed space S by means of the compressor 6, the tubular bag 10 is inflated and further reversed as shown by the broken line, like in the previous embodiments. On this occasion, the level surface of the water defining the closed space S is urged downward, and the other level surface of the water is pushed higher. In this embodiment, since no container is used, the installation space of the reversing apparatus can be very small and the operation cost can be reduced.

In the above embodiments, water is used as the liquid body, but if a liquid having a greater specific gravity, like salt water, is used in place of the water, it is possible to obtain the same pressured head at the level surface in the closed space S with a reduced difference in height between the two levels of the liquid body is shorter. Thus, it is possible to reduce the vertical size of the apparatus.

Also, by sending an appropriate amount of the liquid into the fore part of the tubular bag, it is possible to facilitate smooth reversing of the tubular bag owing to the fact that the tubular bag being pulled floats and goes lightly.

As is clear from the above description, there is no need of packing a bulky pile of length tubular bag in a container. Thus, the object of the invention was attained by the invention, and the operation efficiency was greatly improved.

What is claimed is:

1. A method for reversing an elongate tubular element into a pipe to line the pipe, comprising the steps of:
   providing a predetermined quantity of a liquid into a portion of the elongate tubular element defined solely within an open reversed end portion of the tubular element disposed to be in a generally N shape as viewed from a side, in a manner such that said liquid has first and second level surfaces, the first level surface partially defining a closed space and the second level surface being exposed to atmospheric air;
   arranging the tubular element such that it extends from said open end portion through said liquid via said first and second level surfaces and also penetrates through said closed space, with the reversed end portion held fixed, whereby said reversed portion partially defines a variable volume of said closed space; and
   increasing a pressure in the closed space by supplying compressed air thereto from a compressed air supply source, to thereby pressurize said reversed portion of the tubular element which is defining said closed space to inflate the tubular element to extend and further reverse more of the tubular element,
   wherein the liquid-containing portion of the tubular element is disposed below an end thereof open to the atmosphere and passes over a first support at a first location and then over a second support at a second location higher than said first location.

2. The method according to claim 1, wherein:
   most of the length of the tubular element is initially located in an unreversed form outside the closed space and is forcibly pulled by pressure of the compressed air longitudinally through the liquid and into the closed space filled with compressed air as the tubular element is being reversed.

3. An apparatus for reversing an elongate tubular element into a pipe to line a pipe, comprising:
   means for holding open to the atmosphere a reversed first end of the tubular element, with a reversed first length of the tubular element extending therebelow and supported to have a shape generally like the letter "N" when viewed from a side, a further unreversed length of the tubular element being extended within said first length to an aversion point;
   first and second means for supporting said reversed first length of the tubular element to maintain said generally N-shape thereof during reversing, said first means supporting said tubular element at a location lower than a location at which said second means supports said tubular element;
   a quantity of a liquid of predetermined specific gravity, held solely in said reversed first length of the tubular element in such a manner as to have a first liquid surface exposed to the atmosphere and to have a second liquid surface located at a level between said locations of support by said first and second shape-maintaining means to define and seal a closed space inside a portion of said reversed first length extending to said eversion point; and
   means for providing compressed air to said closed space to pressurize the same so that said first liquid surface is raised correspondingly higher than said second liquid surface, whereby the pressure within said closed space causes a further length of said unreversed tubular element to move inside said reversed first length through said liquid and to evert and become reversed,
   said tubular element providing the sole containment means for said liquid during reversing.

* * * * *